March 31, 1953     A. VIEWEG     2,633,052
REFRACTOMETER WITH FIXED VIEWING SYSTEM AND PRISM
Filed Nov. 15, 1950
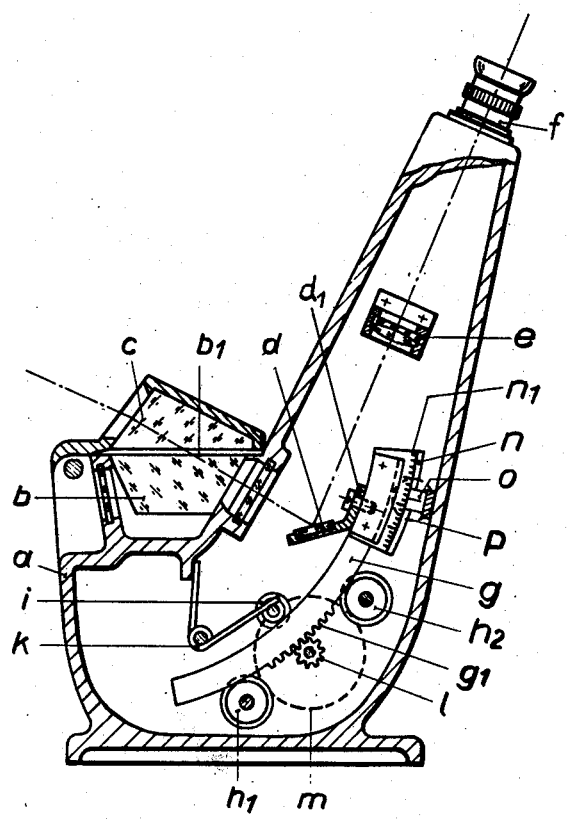
Inventor:
Urwin Vieweg

Patented Mar. 31, 1953

2,633,052

UNITED STATES PATENT OFFICE 2,633,052

REFRACTOMETER WITH FIXED VIEWING SYSTEM AND PRISM

Alwin Vieweg, Heidenheim, Germany, assignor to Zeiss-Opton Optische Werke Oberkochen G. m. b. H., Oberkochen, Wurttemberg, Germany Application November 15, 1950, Serial No. 195,764
In Germany November 19, 1949

3 Claims. (Cl. 88—14)

Modern refractometers, in order to allow of convenient manipulation, are usually arranged so that the telescope for observation of the border line of total reflection and the totally reflecting measuring prism are fixed, the telescope usually with obliquely inclined eyepiece and the measuring prism in such fashion that the measuring surface thereof receiving the material to be examined is horizontal and can be charged from above. This arrangement requires a rotatable deflecting mirror with the aid of which the light leaving the measuring prism obliquely from its bottom surface is directed, in accordance with the refractive index of the material to be examined, into the stationary telescope, and with which the border line during the examination of different substances is maintained in coincidence with a stationary cross line. The rotary movement of the mirror is hereby at the same time utilized as a measuring movement. In instruments with a limited range of measurement, as for example sugar refractometers, this arrangement can be realized without difficulty. In instruments with a large measuring range however an unfavorable location of the point of rotation of the mirror, viz. above the plane of the totally reflecting prism face would be reached. If thereby one wishes to mount the deflecting mirror in customary manner, inconvenient conditions, making manipulation more difficult, would result with undesirably large dimensions. According to the invention these drawbacks can be avoided if, instead of mounting the mirror upon an axis of rotation the deflecting mirror is attached to a sector of an annulus, which is guided within the refractometer housing two rollers engaging an edge of the annulus sector and a resiliently pivoted counterroller engaging the opposite edge of the sector. This results in a very compact assembly and the measuring prism remains freely accessible from above on all sides. Also the housing can be tightly sealed off on all sides in known manner, so that all parts are protected. An especially suitable solution results if one uses the sector of an annulus at the same time also as carrier for the measuring scale so that the deflecting mirror and measuring scale are rigidly connected with one another. The reading of the measuring scale can take place in known manner with aid of a reading magnifier, or a reading telescope, in the latter case suitably in such a way that reading is possible actually in the field of view of the principal telescope for observing the border line of total reflection.

In the accompanying drawing a refractometer according to the invention is represented by a schematic side elevation in partial longitudinal section. In a housing $a$ is seated a totally reflecting measuring prism $b$ having a horizontal face $b_1$ on which the substance to be examined is placed. Over the face $b_1$ is mounted in customary manner a swing out cover prism $c$. The light leaving the measuring prism $b$ is incident on a deflecting mirror $d$ which directs it by way of a telescope objective $e$, firmly mounted in the housing, into an observing ocular $f$. The ocular $f$ contains in known manner a fixed cross line to which the border line of total reflection is brought into alignment. The deflecting mirror $d$ is mounted on a carrier $d_1$ to a sector of an annulus $g$, which is guided by two rollers $h_1$ and $h_2$ firmly mounted in the interior of the housing $a$. A third roller $i$, lying opposite the two rollers $h_1$ and $h_2$ provides through a spring $k$ for a secure contract of the sector $g$ with the two guide rollers. The sector $g$ is provided with a gear $g_1$ which is engaged by a driving pinion $l$ firmly mounted in the housing. On the axis of pinion $l$ is seated outside the housing a pinion head $m$ shown in dotted lines and lying behind the rear cover plate of the housing, with which head the pinion $l$ and therewith the sector $g$ can be moved. With the sector $g$ is further rigidly connected a ruled plate $n$ with a measuring scale $n_1$ co-operating with an index $o$ which is attached to the housing. The measuring scale $n_1$ in known manner can be divided according to refractive indices or some other measuring magnitude. The reading of the value set can take place through a lateral opening $p$ in a front cover plate of the housing $a$ in which is sealed a window or a reading magnifier. (In the drawing the front cover plate is removed and not shown and the window shown in dotted lines.) By arranging the parts as described and shown the surface $b_1$ is always freely accessible for charging and cleaning. Besides, the outer dimensions of the instrument can be kept relatively small in spite of a large range of measurement, since the mirror's point of rotation can be favorably located.

I claim:

1. A refractometer comprising in a housing a refracting prism rigidly mounted with its surface for receiving samples under examination disposed horizontally, and a telescope system comprising an objective lens system and an ocular lens system having a reticule, said telescope system being fixedly mounted in said housing with its optical axis inclined to the mean axial direction of the rays emerging from the rear surface of said prism, and means interposed between said prism and said telescope system comprising a mirror, a carrier piece for said mirror, and means for guiding said carrier piece with said mirror for measuring purposes as a function of the refractive index of the respective sample under examination in order to have the direction of rays after striking said mirror exactly coincident with the direction of the optical axis of said telescope system, a measuring scale fixed to said carrier piece and an index mark in said housing adjacent said scale for reading said scale.

2. A refractometer comprising in a housing a refracting prism rigidly mounted with its surface for receiving samples under examination disposed horizontally, and a telescope system comprising an objective lens system and an ocular lens system having a reticule, said telescope system being fixedly mounted in said housing with its optical axis inclined to the mean axial direction of the rays emerging from the rear surface of said prism, and means interposed between said prism and said telescope system comprising a mirror, a carrier piece of annular shaped sector form for carrying said mirror, and means for guiding said mirror with said carrier piece for measuring purposes as a function of the refractive index of the respective sample under examination in order to have the direction of rays after striking said mirror exactly coincident with the direction of the optical axis of said telescope system, said means for guiding said carrier piece comprising two rollers rigidly pivoted in said housing for supporting said piece at the outer curved bearing surface of said carrier piece, and a counterroller resiliently pivoted for forcing said piece against said two rollers from the inner curved surface side, a measuring scale fixed to said carrier piece and an index mark in said housing adjacent said scale for reading said scale.

3. A refractometer comprising in a housing a refracting prism rigidly mounted with its surface for receiving samples under examination disposed horizontally, and a telescope system comprising an objective lens system and an ocular lens system having a reticule, said telescope system being fixedly mounted in said housing with its optical axis inclined to the mean axial direction of the rays emerging from the rear surface of said prism, and means interposed between said prism and said telescope system comprising a mirror, a carrier piece of annular shaped sector form for carrying said mirror, and means for guiding said mirror with said carrier piece for measuring purposes as a function of the refractive index of the respective sample under examination in order to have the direction of rays after striking said mirror exactly coincident with the direction of the optical axis of said telescope system, said means for guiding said carrier piece comprising two rollers rigidly pivoted in said housing for supporting said piece at the outer curved bearing surface of said carrier piece, and a counterroller resiliently pivoted for forcing said piece against said two rollers from the inner curved surface side, a driving gear engaging said piece for moving it between said rollers, and a knob for operating said gear, a measuring scale fixed to said carrier piece and an index mark in said housing adjacent said scale for reading said scale.

ALWIN VIEWEG.

REFERENCES CITED

The following references are of record in the file of this patent:

UNITED STATES PATENTS

| Number | Name | Date |
| --- | --- | --- |
| 2,341,098 | Hansen | Feb. 8, 1944 |
| 2,391,599 | Silge | Dec. 25, 1945 |

FOREIGN PATENTS

| Number | Country | Date |
| --- | --- | --- |
| 462,332 | Great Britain | Mar. 8, 1937 |